United States Patent [19]
Pfefferle

[11] Patent Number: 4,905,658
[45] Date of Patent: Mar. 6, 1990

[54] METHOD OF OPERATING I.C. ENGINES AND APPARATUS THEREOF

[76] Inventor: William C. Pfefferle, 51 Woodland Dr., Middletown, N.J. 07748

[21] Appl. No.: 301,798

[22] Filed: Jan. 25, 1989

Related U.S. Application Data

[60] Continuation-in-part of Ser. No. 895,468, Dec. 8, 1986, Pat. No. 4,811,707, which is a division of Ser. No. 526,530, Aug. 26, 1983, Pat. No. 4,646,707.

[51] Int. Cl.⁴ .............................................. F02B 51/02
[52] U.S. Cl. .............................. 123/670; 123/188 AA
[58] Field of Search ................. 123/188 AA, 272, 670

[56] References Cited

U.S. PATENT DOCUMENTS

| Re. 30,426 | 11/1980 | Haslett | 123/668 |
| 1,724,526 | 8/1929 | Sokal | 123/670 |
| 1,820,878 | 8/1931 | Wyckoff | 123/670 |
| 3,923,011 | 12/1975 | Pfefferle | 123/670 |
| 4,011,839 | 3/1977 | Pfefferle | 123/670 |
| 4,359,022 | 11/1982 | Nakamura et al. | 123/188 AA |
| 4,398,527 | 8/1983 | Rynbrandt | 123/193 P |
| 4,554,898 | 11/1985 | Yamada et al. | 123/188 AA |
| 4,774,926 | 10/1988 | Adams | 123/188 AA |

FOREIGN PATENT DOCUMENTS

| 0122310 | 7/1983 | Japan | 123/188 AA |
| 0133420 | 8/1983 | Japan | 123/670 |
| 0144624 | 8/1983 | Japan | 123/670 |
| 0000611 | 1/1987 | Japan | 123/188 AA |
| 0051705 | 3/1987 | Japan | 123/188 AA |
| 2079401 | 1/1982 | United Kingdom | 123/188 AA |

Primary Examiner—David A. Okonsky
Attorney, Agent, or Firm—Kane, Dalsimer, Sullivan, Kurucz, Levy, Eisele and Richard

[57] ABSTRACT

Operation of in-cylinder fuel injected internal combustion engines is improved by use of exhaust valves having an effective ignition catalyt on the valve face. In operation of the engine, fuel is injected into air and ignited by contact with the valve face prior to top dead center.

15 Claims, 1 Drawing Sheet

METHOD OF OPERATING I.C. ENGINES AND APPARATUS THEREOF

CROSS-REFERENCE TO RELATED APPLICATIONS

This application is a continuation-in-part of my copending U.S. patent application Ser. No. 895,468 filed Dec. 8, 1986 and now U.S. Pat. No. 4,811,707, which in turn is a division of U.S. Ser. No. 526,530 filed Aug. 26, 1983 (now U.S. Pat. No. 4,646,707).

BACKGROUND OF THE INVENTION

1. Field of the Invention

This invention relates to an improved method of operating unthrottled internal combustion engines. More specifically, this invention relates to a method for improved ignition in unthrottled internal combustion engines. This invention also relates to means for utilizing low cetane fuels in unthrottled internal combustion engines. Moreover, this invention relates to means applicable to existing diesel engines.

2. Brief Description of the Prior Art

Existing diesel engines achieve a significantly higher thermal efficiency than conventional gasoline engines in automotive use and acceptable emissions of carbon monoxide and light hydrocarbons. However, emissions levels of soot and nitrogen oxide are high and compression ratios are higher than the optimum for maximum fuel economy, especially in high speed engines. Moreover diesels are relatively hard to start as compared to automotive gasoline engines, even with electrically heated glow plugs, and require high cetane fuels. This is especially true of the lower compression diesels such as the large lower speed engines. In addition to the above cited shortcomings, conventional diesels cannot be operated at low enough compression ratios for maximum efficiency and cannot efficiently utilize low cetane fuels such as methanol and gasoline. Although in-cylinder catalysts previously proposed can both improve efficiency and reduce emissions of soot and nitrogen oxides, retrofitting of existing engines is not always economically feasible, especially with small automotive diesels. The present invention provides economical means for catalytic ignition in existing diesel engines, whether or not such engines are provided with glow plugs for use in starting.

Attempts have been made to operate unthrottled fuel injected engines at lower than diesel compression ratios. With compression ratios too low for autoignition, an ignition source such as a spark plug or a continuously operating glow plug is needed. Thus, stratified charge spark-ignited engines of various designs, both piston and rotary, have been proposed. To date, such engines have not won acceptance. For use with heavy fuels such as diesel and jet A, spark plug fouling has been a severe problem leading to the use of glow plugs. Although use of glow plugs eliminates the fouling problem with heavy fuels, a higher glow plug temperature is required for operating a low compression ratio engine than for cold starting a conventional diesel engine. This is believed to be because the compression temperature of a low compression engine is lower than that of a high compression diesel at cold start conditions. Another factor may be that the ignition temperature of hydrocarbon fuels is higher at lower pressures than at higher pressures. With the high continuous operating temperature required using conventional glow plugs in a low compression engine, typically in excess of about 1375° K., plug heat losses must be minimal if plug power requirements are to be acceptable at all operating conditions. With such a low heat loss plug it has been found that not only is no electrical power required at full load operation but that plug temperatures can even exceed the temperature limits of a high temperature material such as silicon nitride. Although much larger plugs could be used to lower operating temperature to some extent, power requirements would be excessive and space might not be available. The present invention provides for operation of unthrottled internal combustion engines at lower than normal diesel compression ratios without the use of spark plugs or continuously heated glow plugs as well as improved combustion at conventional compression ratios.

Conventional spark ignition engines are typically less efficient than diesel engines in spite of operating in close approximation to the constant volume combustion Otto cycle, a more efficient cycle than the diesel cycle. This lower efficiency is believed to result primarily from the throttling losses associated with the requirement for spark ignition. Spark ignition of homogeneous charge fuel-air mixtures requires near stoichiometric fuel-air ratios for flame propagation. Thus, to control power levels the amounts of fuel and air must both be varied in step. This requires throttling of the inlet air with resultant loss of pressure energy. The requirement for operation at fuel-air ratios near stoichiometric also has the disadvantage of resulting in high emissions of nitrogen oxides. In addition, octane levels of available fuels typically limit compression ratios to below optimum levels. Operation of spark engines without throttling of the inlet air could result in an engine more efficient than the diesel, even if such engines were limited to below optimum compression ratios. The present invention provides a catalytic method for operation of in-cylinder fuel injected engines which enables such engines to more nearly approach the efficiency of an unthrottled homogeneous charge engine.

The present invention thus offers significant advantages in the operation of internal combustion engines including both improved efficiency and reduced emissions.

SUMMARY OF THE INVENTION

It has now been discovered that the exhaust valves of internal combustion engines typically operate sufficiently hotter than most other portions of the combustion chamber surfaces such that ignition catalyst faced exhaust valves are especially effective for catalytic ignition in an internal combustion engine. With catalytic exhaust valves, effective catalytic ignition can be obtained with a variety of fuels and at lower compression ratios. Even a low cetane fuel such as methanol is readily combusted in a conventional diesel engine equipped with catalytic valves of the present invention. With conventional diesel fuels, design compression ratios can be lower than would otherwise be required for effective auto-ignition over the design range of operating conditions.

In the present invention, improved ignition of the fuel by virtue of catalytic action is believed to result from surface oxidation of a minor amount of the fuel. It is believed that the catalyst injects radical species into the gas phase, thus lowering the temperature required for gas phase combustion. It is well known that radical species can speed up combustion. Accordingly, for effective ignition according to this invention, the required catalyst temperature is much lower than the instantaneous auto-ignition temperature of the fuel-air mixture or than the temperature required with a hot non-catalytic surface.

At surface temperatures below those required for ignition of the fuel, the presence of a catalyst, especially one of high porosity, can even delay gas phase combustion. This result is believed to stem from quenching of radicals generated in the gas phase. It has long been known that such quenching of free radicals is promoted by active catalyst surfaces. It is believed that porous catalytic surfaces are such poor ignition catalysts because the catalyst pores can not only trap fuel but because the pores can trap free radicals long enough for radical recombination. Conventional high surface area, high porosity catalysts are particularly ineffective for ignition, even though such catalysts are much more active than nonporous igniters for surface oxidation of fuels and surface heating. Although quenching of radicals has been suggested as a means to inhibit gum formation prior combustion in both spark and autoignition engines, the resulting inhibition of combustion is disadvantageous inasmuch such inhibition can quench combustion prior to completion resulting in high emissions of hydrocarbons and carbon monoxide.

Accordingly, the exhaust valves of the present invention employ thin, catalytic coatings of low porosity. Oxide ignition catalysts, such as the lantanum-chrome perovskites or catalysts containing oxides of nickel or manganese, may be coated directly onto a metal or ceramic exhaust valve face, as for example by sputtering. Ceramic valves are advantageous in that the valve face is nonporous and suitable for direct application of a catalytic coating using coating techniques known in the art or may be made of a catalytic ceramic, e.g. a perovskite. For precious metal ignition catalysts, the method of my U.S. Pat. No. 4,341,662 is advantageous. With metal valves, the valve face is preferably coated with a thin low porosity ceramic layer, as by flame spraying or other method known in the art, prior to coating with the precious metal catalyst, as for example is described in my U.S. Pat. No. 4,603,547.

BRIEF DESCRIPTION OF THE DRAWINGS

This invention can be further understood with reference to the drawings in which.

DETAILED DESCRIPTION OF PREFERRED EMBODIMENTS OF THE INVENTION

This invention relates to a method of operating a low compression unthrottled engine wherein fuel and compressed air are contacted with the hot catalytic surface of a catalytic exhaust valve at a time prior to top dead center, whereby the fuel is ignited and combustion occurs in the immediate vicinity of top dead center. In engines utilizing the method of the present invention, any conventional diesel fuel may be used. Fuel is injected prior to top dead center, preferably starting at least about ten crank angle degrees prior to top dead center. Unlike conventional diesel engines, even fuels such as methanol, ethanol, and unleaded gasoline may be used. Thus, engines with a multifuel capability are possible.

Figure 1:
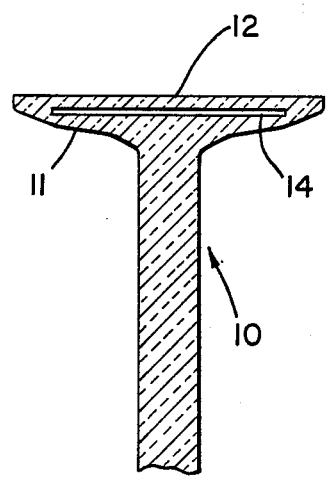
FIG. 1 is a cross-sectional side elevation of a catalytic valve of the present invention with an ignition catalyst surface.

As shown in FIG. 1, exhaust valve 10 of the present invention is similar in appearance to a conventional exhaust valve. However, valve 10 differs functionally from a conventional exhaust valve in that ignition catalyst 12, forming the combustion chamber face of valve head 11, provides an effective fuel ignition means in an operating internal combustion engine. Optional air gap 14 constitutes a thermal break and allows valve face catalyst 12 to operate at a higher temperature, permitting effective ignition at high engine speeds under varying load conditions. Advantageously, valve 10 is constructed of a ceramic. Not only can typical ceramics withstand higher operating temperatures than present metal valves, enabling more effective catalytic action with less costly catalysts, but such valves can be made lighter enabling faster valve action and permitting higher engine speeds. Representative ceramic materials useful in fabricating valve 10 are silicon nitride, magnesium aluminate, and the like. With metal valves it is advantageous to use a nickel-chromium alloy such as inconel or a similar high temperature alloy for valve head 11.

Figure 2:
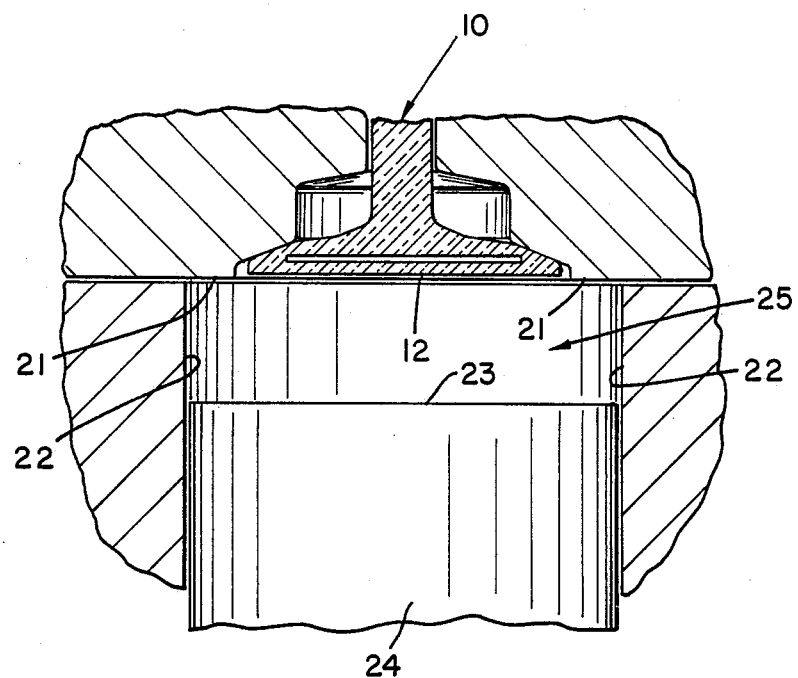
FIG. 2 is a cross-sectional side elevation, in part, of a catalytic valve of the present invention installed in the head of a two cycle valve in head internal combustion engine.

Valves of the present invention are useful in achieving efficient combustion in many types of internal combustion engines. One especially advantageous application is in valve-in-head two stroke diesel engines to permit combustion of low cetane fuels such as methanol over the full range of engine operating speeds and loads. As shown in FIG. 2, engine combustion chamber 25 is defined by engine head wall 21, cylinder walls 22, crown 23 of piston 24 and face 12 of valve 10. In operation of the engine, fuel is injected into engine combustion chamber 25 during the compression stroke of piston 24 by fuel injector 20 and brought into contact with catalytic valve face 12 by the motion of piston 24.

The following Example describes the manner and the process of making and using the invention and sets forth a preferred mode for carrying out the invention.

EXAMPLE

To demonstrate the effectiveness of valves of the present invention, several exhaust valves for a Hatz E673 diesel engine were coated on the face with a commercial flame sprayed layer of zirconia estimated to be about ten mils in thickness. The zirconia coated face of one of the valves was then painted with a solution containing two grams of platinum as chloroplatinic acid and one gram of aluminum nitrate per five milliliters of a nominal forty percent solution of zirconyl nitrate. The valve face was air dried and then flame heated with a propane torch to form a bonded surface layer of a platinum catalyst. The coated exhaust valve was then installed in a Hatz 673 test engine and operated with anhydrous methanol mixed with diesel fuel. During operation of the engine fuel was injected prior to top dead center using the injection timing for the engine as delivered. The engine operated satisfactorily with methanol concentrations up to about ninety percent, the highest concentration allowed without vapor-lock by the fuel injection system of the Hatz test engine. With conventional diesel engines, not much more than about fifty percent methanol can be substituted for diesel fuel without misfire.

What is claimed is:

1. An exhaust valve for an unthrottled internal combustion engine in which the surface of the valve face comprises an effective ignition catalyst.

2. The valve of claim 1 in which said ignition catalyst comprises platinum.

3. The valve of claim 1 in which said catalyst comprises a base metal oxide.

4. The valve of claim 3 in which said base metal oxide comprises chromia.

5. The valve of claim 3 in which said base metal oxide comprises a rare earth.

6. The valve of claim 1 in which the head of said valve comprises a ceramic.

7. The valve of claim 1 in which the head of said valve comprises a high service temperature nickel-chromium alloy.

8. The valve of claim 1 in which said valve face surface is substantially nonporous.

9. The valve of claim 6 in which said ceramic is an effective ignition catalyst.

10. The valve of claim 1 in which said valve face surface is underlaid by a thermal break.

11. The method of operating an unthrottled internal combustion engine comprising:
 a. Injecting fuel into compressed air prior to top dead center,
 b. Contacting said fuel with the catalytic surface of a hot exhaust valve face, and
 c. thereby combusting said fuel and producing a combustion pressure wave in the immediate vicinity of top dead center.

12. The method of claim 11 wherein said fuel is injected at least ten crank angle degrees before top dead center.

13. The method of claim 11 wherein said engine is a two stroke valve in head engine.

14. The method of claim 11 wherein said valve face comprises a ceramic effective for ignition of fuels.

15. The method of claim 11 wherein said valve face surface is underlaid by an insulating thermal break.

* * * * *